US012465933B2

(12) United States Patent
Lai et al.

(10) Patent No.: US 12,465,933 B2
(45) Date of Patent: Nov. 11, 2025

(54) BEAUTY SHOWER

(71) Applicant: Xiamen Solex High-Tech Industries Co., Ltd., Fujian (CN)

(72) Inventors: Honghui Lai, Fujian (CN); Lian Zhang, Fujian (CN); Tingke Liu, Fujian (CN); Mingfu Zhang, Fujian (CN)

(73) Assignee: Xiamen Solex High-Tech Industries, Xiamen (CN)

( * ) Notice: Subject to any disclaimer, the term of this patent is extended or adjusted under 35 U.S.C. 154(b) by 365 days.

(21) Appl. No.: 18/090,603

(22) Filed: Dec. 29, 2022

(65) Prior Publication Data

US 2023/0133323 A1 May 4, 2023

Related U.S. Application Data

(63) Continuation of application No. PCT/CN2021/004647, filed on Jul. 6, 2021.

(30) Foreign Application Priority Data

Jul. 7, 2020 (CN) ........................ 202010646338.X

(51) Int. Cl.
*B05B 1/18* (2006.01)
*B05B 7/24* (2006.01)

(52) U.S. Cl.
CPC .............. *B05B 7/2464* (2013.01); *B05B 1/18* (2013.01)

(58) Field of Classification Search
CPC ... B05B 15/025; B05B 7/0408; B05B 7/1209; B05B 15/02; B05B 7/2464; B05B 1/18; B05B 7/1218
See application file for complete search history.

(56) References Cited

U.S. PATENT DOCUMENTS 3,720,352 A * 3/1973 Kozlowski ........... A47K 5/1205 222/518
4,099,672 A * 7/1978 Sheahan ............... B05B 7/2445 239/317
4,432,105 A * 2/1984 Pitroda ................... E03C 1/046 4/615

(Continued)

FOREIGN PATENT DOCUMENTS

CH 619361 A5 9/1980
CN 87205941 U 1/1988

(Continued)

OTHER PUBLICATIONS

Corresponding PCT International Application No. PCT/CN2021/104647, International Search Report, date of mailing Sep. 28, 2021.

(Continued)

*Primary Examiner* — Qingzhang Zhou

(74) *Attorney, Agent, or Firm* — Cooper Legal Group, LLC

(57) ABSTRACT

A beauty shower comprises a shower body. The shower body comprises a water flow passage connected to a water inlet port and a water outlet nozzle and a cavity for storing a liquid beauty medium, the cavity is connected to the water flow passage through a liquid suction device, and the shower body further comprises a water flow driving device configured to drive the liquid suction device to pump the liquid beauty medium to the water flow passage.

11 Claims, 3 Drawing Sheets

(56) References Cited

U.S. PATENT DOCUMENTS

| | | | | |
|---|---|---|---|---|
| 9,022,073 | B2 * | 5/2015 | Strauli | F04F 5/463 137/893 |
| 2014/0115765 | A1 * | 5/2014 | Carpenter | A61L 9/14 4/223 |
| 2020/0360947 | A1 * | 11/2020 | Guthrie | E03C 1/046 |

FOREIGN PATENT DOCUMENTS

| | | | | |
|---|---|---|---|---|
| CN | 201042683 | Y | | 4/2008 |
| CN | 104721922 | A | | 6/2015 |
| CN | 206715971 | U | | 12/2017 |
| CN | 206729804 | U | | 12/2017 |
| CN | 107981758 | A | | 5/2018 |
| CN | 108209666 | A | | 6/2018 |
| CN | 207507941 | U | | 6/2018 |
| CN | 210146263 | U | | 3/2020 |
| CN | 210171795 | U | | 3/2020 |
| CN | 212702495 | U | | 3/2021 |
| DE | 2735533 | A1 | | 1/1979 |
| DE | 102004054139 | A1 | | 5/2006 |
| GB | 2216815 | A | | 10/1989 |
| JP | S62148189 | U | | 9/1987 |
| JP | H05293053 | A | | 11/1993 |
| JP | 2000107061 | A | * | 4/2000 |
| JP | 2006342500 | A | | 12/2006 |
| JP | 2010088885 | A | | 4/2010 |

OTHER PUBLICATIONS

Written Decision on Registration cited in KR10-2023-7003452, mailed May 1, 2025, 6 pages.

First CN Office Action cited in CN202010646338.X, mailed Jun. 22, 2023, 11 pages.

Rejection Decision cited in CN202010646338.X, mailed Aug. 12, 2023, 14 pages.

First JP Office Action cited in JP2022-564602, mailed Oct. 24, 2023, 6 pages.

Decision to Grant in JP2022-564602, mailed Mar. 5, 2024, 5 pages.

Request for the Submission of an Opinion in KR10-2023-7003452, mailed Oct. 29, 2024, 9 pages.

* cited by examiner

BEAUTY SHOWER

RELATED APPLICATIONS

This application is a continuation of International patent application PCT/CN2021/104647, filed on Jul. 6, 2021, which claims priority to Chinese patent application number 202010646338.X, filed on Jul. 7, 2020. International patent application PCT/CN2021/104647 and Chinese patent application number 202010646338.X are incorporated herein by reference.

FIELD OF THE DISCLOSURE

The present disclosure relates to sanitary products, and in particular to a shower device.

BACKGROUND OF THE DISCLOSURE

The traditional beauty shower usually uses water as an exchange medium, introduces the water into a storage cavity configured for storing a beauty solution, and mixes the beauty solution with the water by means of displacement reaction. During the displacement reaction, a concentration of the beauty solution is larger in an early stage, and as the water flows into the storage cavity for the beauty solution in a later stage, the concentration released into the water will become weaker and weaker.

Traditional beauty product suction devices are powered by electricity, which consumes energy and requires electronic components such as motors and lithium batteries, and the cost is relatively high.

BRIEF SUMMARY OF THE DISCLOSURE

The present disclosure provides a beauty shower to enable a mixed ratio of liquid beauty medium to water to always be kept constant.

In order to solve the technical problem, a first technical solution of the present disclosure is as follows.

A beauty shower comprises a shower body. The shower body comprises a water flow passage connected to a water inlet port and a water outlet nozzle and a cavity for storing a liquid beauty medium. The cavity is connected to the water flow passage through a liquid suction device. The shower body further comprises a water flow driving device configured to drive the liquid suction device to pump the liquid beauty medium to the water flow passage.

In a preferred embodiment, the water flow driving device comprises a water diversion body and an impeller which are disposed in the water flow passage, and a flow direction of water in the water flow passage is configured to be changed by the water diversion body so as to enable the impeller to be driven to rotate.

In a preferred embodiment, the liquid suction device is a diaphragm pump. A liquid inlet port of the liquid suction device is connected to the cavity, and a liquid outlet port of the liquid suction device is connected to the water flow passage. A piston of the diaphragm pump is connected to the impeller through an eccentric mechanism.

In a preferred embodiment, the liquid inlet port is connected to the cavity through a flexible tube.

In a preferred embodiment, an adjusting device for adjusting a liquid suction volume is provided, and the adjusting device is configured to change an inner diameter of the flexible tube.

In a preferred embodiment, the adjusting device comprises a roller and a pressing block disposed on the roller, and the roller is configured to be rotated to change a squeezing degree of the pressing block to the flexible tube to change the inner diameter of the flexible tube.

In a preferred embodiment, the shower body further comprises an opening in communication with the cavity and a cover plate for opening or closing the opening.

In a preferred embodiment, one end of the cover plate is rotatably connected to a front end portion of the shower body.

In a preferred embodiment, a plug for being inserted into the opening is disposed on a side of the cover plate facing the opening, and a sealing ring is disposed on a side wall of the plug.

In a preferred embodiment, a side wall of the cavity comprises a ventilation port in communication with outside atmosphere, and a check valve is disposed on the ventilation port.

Compared with the existing techniques, the technical solution has the following advantages.

The present disclosure provides the beauty shower comprising the water flow driving device configured to drive the liquid suction device to pump the liquid beauty medium to the water flow passage, and extra electrical energy does not need to be consumed to enable energy saving and environmental protection. In addition, when a flow rate of water in the water flow passage does not change, a rotation speed of the water flow driving device is constant, which makes a ratio of the liquid beauty medium to the water always be constant. When the flow rate of the water in the water flow passage decreases, the rotation speed of the water flow driving device will decrease, and a corresponding amount of the liquid beauty medium mixed into the water will also decrease. Similarly, when the flow rate of the water in the water flow passage increases, the rotation speed of the water flow driving device will increase, and the corresponding amount of the liquid beauty medium mixed into the water will also increase accordingly. In this way, when the flow rate of water changes, an amount of the liquid beauty medium also changes correspondingly, so that the ratio of the liquid beauty medium to the water is substantially kept constant. The present disclosure provides the cavity for storing the liquid beauty medium detachably disposed on a back of the shower body and located above the water outlet nozzle. Replacement of the liquid beauty medium is facilitated, an inner space of the shower body is fully utilized, and the shower body is more compact.

DETAILED DESCRIPTION OF THE EMBODIMENTS

Figure 1:
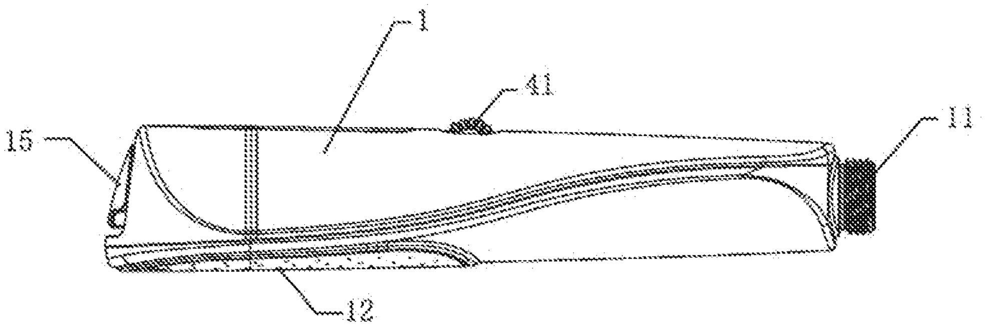
FIG. 1 illustrates a side view of a beauty shower of a preferred embodiment in the present disclosure.

The present disclosure will be further described below in combination with the accompanying drawings and embodiments.

The following will clearly and completely describe the technical solutions in the embodiments of the present disclosure with reference to the accompanying drawings. Obviously, the described embodiments are only a portion of the embodiments of the present disclosure, and not all of the embodiments. Based on the embodiments of the present disclosure, all other embodiments obtained by those of ordinary skill in the art without creative work fall within the protection scope of the present disclosure.

In the description of the present disclosure, it should be noted that the terms “upper”, “lower”, “inner”, “outer”, “top/bottom”, etc. indicate the orientation or positional relationship based on the orientation shown in the drawings. The positional relationship is only for the convenience of describing the present disclosure and simplifying the description, rather than indicating or implying that the referenced device or element must have a specific orientation, be constructed, and be operated in a specific orientation. Therefore, the positional relationship should not be understood as a limitation of the present disclosure. In addition, the terms “first” and “second” are only used for descriptive purposes and should not be understood as indicating or implying relative importance.

In the description of the present disclosure, it should be noted that the terms “installed”, “provided with”, “sleeved/connected”, “connected”, etc., should be understood broadly. For example, “connected” can be a fixed connection, a detachable connection, or an integral connection, a mechanical connection, an electrical connection, a direct connection, or an indirect connection through an intermediate medium, and it can be a connection between two members. For those of ordinary skill in the art, the specific meaning of the above terms in the present disclosure can be understood under specific conditions.

Figure 2:
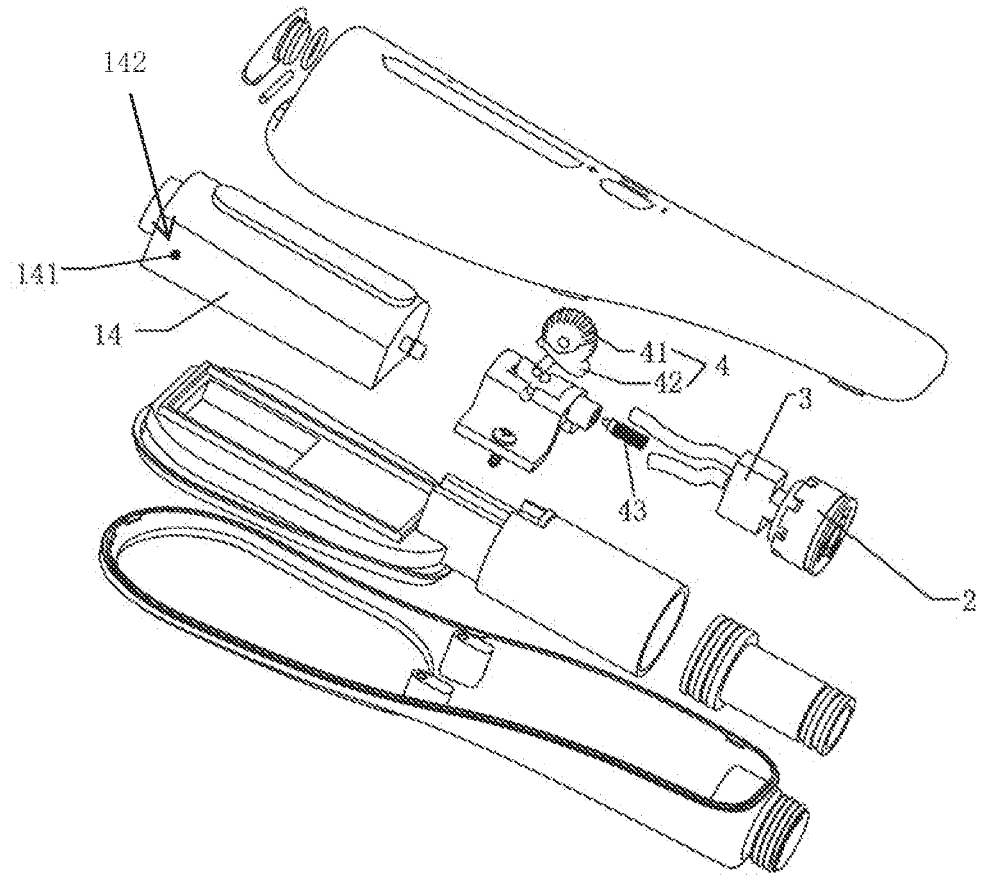
FIG. 2 illustrates an exploded view of the beauty shower of a preferred embodiment in the present disclosure.
Figure 3:
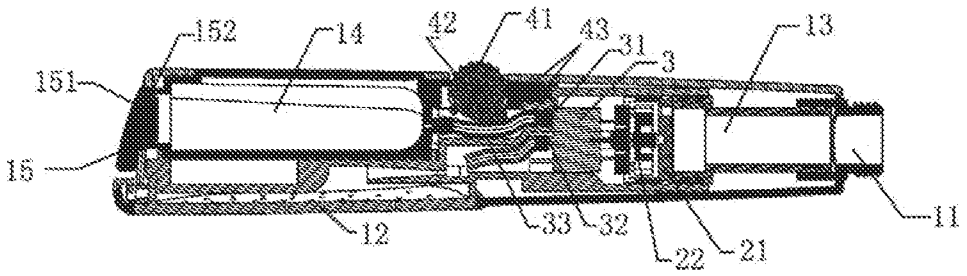
FIG. 3 illustrates a cross-sectional view of the beauty shower of a preferred embodiment in the present disclosure.

Referring to FIGS. 1-3, a beauty shower comprises a shower body 1, and the shower body 1 comprises a water flow passage 13 connected to a water inlet port 11 and a water outlet nozzle 12 and a cavity 14 for storing a liquid beauty medium.

The cavity 14 is connected to the water flow passage 13 through a liquid suction device 3. The shower body 1 further comprises a water flow driving device 2 (e.g., a water-driven rotating device) configured to drive the liquid suction device 3 to pump the liquid beauty medium to the water flow passage 13.

In the beauty shower, the water flow driving device 2 is used to drive the liquid suction device 3 to pump the liquid beauty medium in the cavity 14 into the water flow passage 13, which does not require energy consumption, saves energy, and protects the environment. In addition, when a flow rate of water in the water flow passage 13 does not change, a rotation speed of the water flow driving device 2 is constant, which makes a ratio of the liquid beauty medium to the water always be constant. When the flow rate of the water in the water flow passage 13 decreases, the rotation speed of the water flow driving device 2 will decrease, and a corresponding amount of the liquid beauty medium mixed into the water will also decrease. Similarly, when the flow rate of the water in the water flow passage 13 increases, the rotation speed of the water flow driving device 2 will increase, and the corresponding amount of the liquid beauty medium mixed into the water will also increase accordingly. In this way, when the flow rate of water changes, an amount of the liquid beauty medium also changes correspondingly, so that the ratio of the liquid beauty medium to the water is substantially kept constant.

In the above-mentioned embodiment, the water flow driving device 2 comprises a water diversion body 21 and an impeller 22 disposed in the water flow passage 13. A flow direction of the water in the water flow passage 13 is changed by the water diversion body 21 so as to drive the impeller 22 to rotate. The liquid suction device 3 is a diaphragm pump, a liquid inlet port 31 of the liquid suction device 3 is connected to the cavity 14, and a liquid outlet port 32 of the liquid suction device 3 is connected to the water flow passage 13. A piston of the diaphragm pump is connected to the impeller 22 through an eccentric mechanism. When the impeller 22 rotates, the impeller 22 will drive the eccentric mechanism to rotate, and the eccentric mechanism transfers an eccentric rotation to movement of the piston along an axial direction of the diaphragm pump. The structure of the diaphragm pump is in the prior art and is not expanded upon too much in this embodiment.

In this embodiment, the liquid inlet port 31 is connected to the cavity 14 through a flexible tube 33. In order to further facilitate a user adjusting a pumping volume of the liquid beauty medium by himself, an adjusting device 4 for adjusting a liquid suction volume is provided, and the adjusting device 4 is used to change an inner diameter of the flexible tube 33.

Specifically, the adjusting device 4 comprises a roller 41 and a pressing block 42 disposed on the roller 41, and the roller 41 is rotated to change a squeezing degree of the pressing block 42 to the flexible tube 33 to change the inner diameter of the flexible tube 33. When the user feels that the pumping amount of the liquid beauty medium is too large, the user only needs to turn the roller 41 by hand to drive the pressing block 42 to further squeeze the flexible tube 33 to make the inner diameter of the flexible tube 33 smaller. A housing of the shower body 1 comprises a through groove for exposing the roller 41, and an indicator “+” and an indicator “−” are respectively provided on an upper end and a lower end of the through groove, which are used to instruct the user to rotate the roller 41 in a “+” direction (i.e., rotates toward the indicator “+”) to increases the pumping amount of the liquid beauty medium or in a “−” direction (i.e., rotates toward the indicator “−”) to decrease the pumping amount of the liquid beauty medium.

At the same time, in order to improve stability of the pumping amount of the liquid beauty medium to enable the roller 41 not to roll when there is no manual manipulation, the adjusting device 4 further comprises an elastic positioning pin 43, and the roller 41 comprises a plurality of positioning grooves along a rolling direction of the roller 41. When the roller 41 is not manually moved, the elastic positioning pin 43 is buckled to one of the plurality of positioning grooves to inhibit movement of the roller 41 along a rotation direction of the roller 41.

In addition, in order to facilitate supplying of the liquid beauty medium, the shower body 1 further comprises an opening in communication with the cavity 14 and a cover plate 15 for opening or closing the opening. In this embodiment, the opening is defined on a side wall of a front end portion of the shower body 1, and one end of the cover plate 15 is rotatably connected to the front end portion of the shower body 1.

In order to achieve sealing of the opening by the cover plate 15, a plug 151 for being inserted into the opening is disposed on a side of the cover plate 15 facing the opening, and a sealing ring 152 is disposed on a side wall of the plug 151.

Finally, a side wall of the cavity 14 further comprises a ventilation port in communication with outside atmosphere, and a check valve 141 is disposed on the ventilation port. Air pressure balance between the cavity 14 and the outside atmosphere can be ensured through the ventilation port, and there will be no negative pressure in the cavity 14 after the liquid beauty medium is consumed. The purpose of providing the check valve 141 is to prevent the liquid beauty medium from flowing out of the ventilation port.

In this embodiment, the cavity 14 for storing the liquid beauty medium is detachably disposed on a back of the shower body 1 and located above the water outlet nozzle 12. Replacement of the liquid beauty medium is facilitated, an inner space of the shower body 1 is fully utilized, and the shower body 1 is more compact.

In this embodiment, switching between shower water and beauty water can also be conveniently achieved by adjusting the adjusting device 4.

In this embodiment, the liquid beauty medium may be essential oil, shower gel, shampoo, or essence. The aforementioned embodiments are merely some embodiments of the present disclosure, and the scope of the disclosure is not limited thereto. Thus, it is intended that the present disclosure cover any modifications and variations of the presently presented embodiments provided they are made without departing from the appended claims and the specification of the present disclosure.

What is claimed is:

1. A beauty shower, comprising:
a shower body, wherein:
the shower body comprises a water flow passage connected to a water inlet port and a water outlet nozzle and a cavity for storing a liquid beauty medium,
the cavity is connected to the water flow passage through a pump,
the shower body further comprises a water flow driving device configured to drive the pump to pump the liquid beauty medium to the water flow passage,
the water flow driving device comprises a water diversion body and an impeller which are disposed in the water flow passage, and
a flow direction of water in the water flow passage is configured to be changed by the water diversion body so as to enable the impeller to be driven to rotate,
the pump is a diaphragm pump,
a liquid inlet port of the diaphragm pump is connected to the cavity,
a liquid outlet port of the diaphragm pump is connected to the water flow passage, and
a piston of the diaphragm pump is connected to the impeller through an eccentric mechanism.

2. The beauty shower according to claim 1, wherein:
the liquid inlet port is connected to the cavity through a flexible tube.

3. The beauty shower according to claim 2, wherein:
an adjusting device for adjusting a liquid suction volume is provided, and
the adjusting device is configured to change an inner diameter of the flexible tube.

4. The beauty shower according to claim 3, wherein:
the adjusting device comprises a roller and a pressing block disposed on the roller, and
the roller is configured to be rotated to change a squeezing degree of the pressing block to the flexible tube to change the inner diameter of the flexible tube.

5. The beauty shower according to claim 1, wherein:
the shower body further comprises an opening in communication with the cavity and a cover plate for opening or closing the opening.

6. The beauty shower according to claim 5, wherein:
one end of the cover plate is rotatably connected to a front end portion of the shower body.

7. The beauty shower according to claim 6, wherein:
a plug for being inserted into the opening is disposed on a side of the cover plate facing the opening, and
a sealing ring is disposed on a side wall of the plug.

8. The beauty shower according to claim 7, wherein:
a side wall of the cavity comprises a ventilation port in communication with outside atmosphere, and
a check valve is disposed on the ventilation port.

9. The beauty shower according to claim 1, wherein:
the cavity for storing the liquid beauty medium is detachably disposed on a back of the shower body and located above the water outlet nozzle.

10. A beauty shower, comprising:
a shower body, wherein:
the shower body comprises a water flow passage connected to a water inlet port and a water outlet nozzle and a cavity for storing a liquid beauty medium,
the cavity is connected to the water flow passage through a pump,
the shower body further comprises a water-driven rotating device configured to drive the pump to pump the liquid beauty medium to the water flow passage, and
the shower body further comprises an opening in communication with the cavity and a cover plate for opening or closing the opening.

11. A beauty shower, comprising:
a shower body, wherein:
the shower body comprises a water flow passage connected to a water inlet port and a water outlet nozzle and a cavity for storing a liquid beauty medium,
the cavity is connected to the water flow passage through a pump,
the shower body further comprises a water-driven rotating device configured to drive the pump to pump the liquid beauty medium to the water flow passage, and
the cavity for storing the liquid beauty medium is detachably disposed on a back of the shower body and located above the water outlet nozzle.

* * * * *